F. P. HOLMES.
SPRING WHEEL.
APPLICATION FILED JULY 6, 1911.
1,091,515.
Patented Mar. 31, 1914.
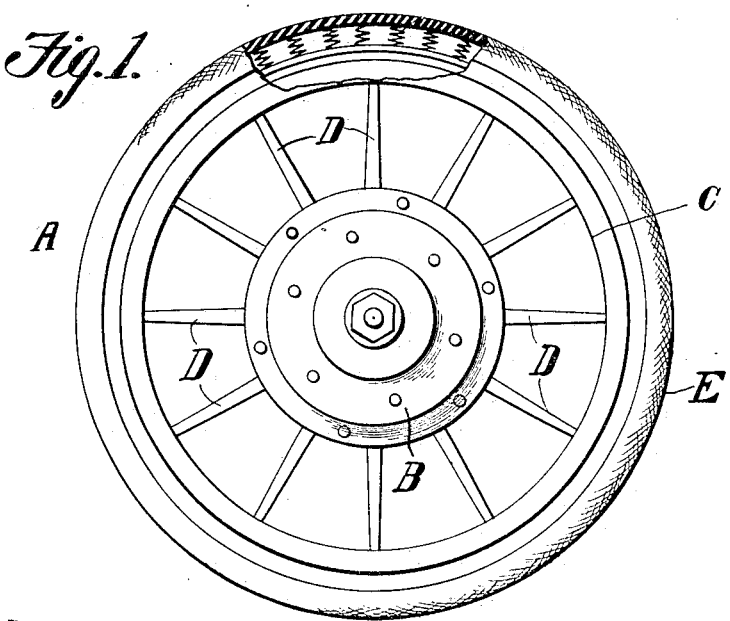
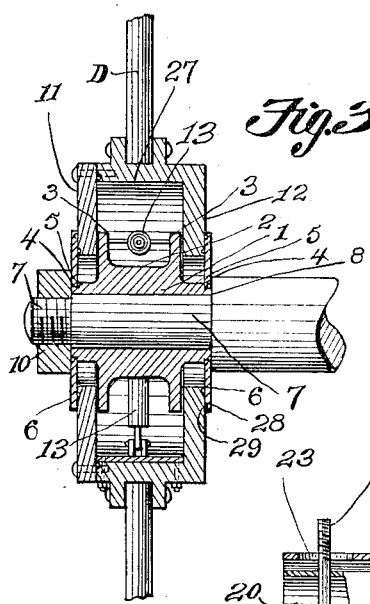
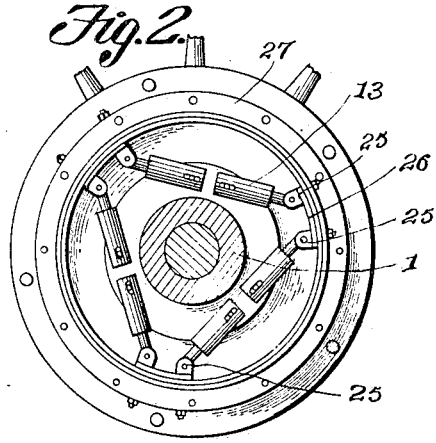
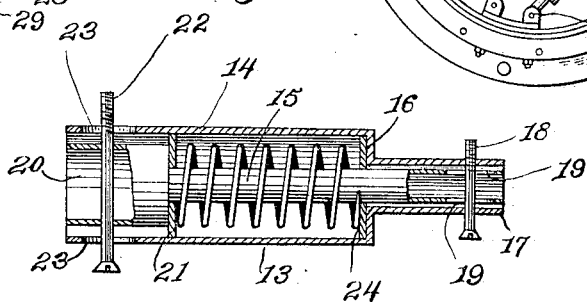
Witnesses
B. M. Offutt
William C. Linton
Inventor
F. P. Holmes.
By Wm. C. W. Intire
Attorney UNITED STATES PATENT OFFICE.

FAY PETER HOLMES, OF LARNED, KANSAS.

SPRING-WHEEL.

1,091,515.

Specification of Letters Patent.

Patented Mar. 31, 1914.

Application filed July 6, 1911. Serial No. 637,139.

*To all whom it may concern:*

Be it known that I, FAY PETER HOLMES, a citizen of the United States, residing at Larned, in the county of Pawnee and State of Kansas, have invented certain new and useful Improvements in Spring-Wheels; and I do hereby declare the following to be a full, clear, and exact description of the invention, such as will enable others skilled in the art to which it appertains to make and use the same.

This invention relates to new and useful improvements in wheels, and more particularly to the construction of hubs for resilient or spring wheels.

An object of this invention is the provision of a wheel having a hub consisting of a plurality of sections connected in such manner as to produce sufficient resiliency to absorb all shock upon the various parts of the vehicle to which the wheel is applied, thereby making possible the elimination of the customary pneumatic tires now necessarily employed.

Another object of this invention is to improve and simplify devices of this character, rendering them comparatively simple and inexpensive to manufacture, reliable and efficient in use, and readily assembled or taken apart for the purpose of renewing any of the several elements.

With the above and other objects in view, this invention resides in the novel features of construction, formations, combinations and arrangements of parts to be hereinafter more fully described and claimed, and illustrated in the accompanying drawings, in which—

Figure 1 is a side elevation of my improved resilient wheel showing it partly broken away. Fig. 2 is a side view of the hub of the wheel, with one of the side disks removed and showing the hub and shaft in cross section. Fig. 3 is a longitudinal sectional view taken through the hub; and Fig. 4 is a detail sectional view of one of the members which connect the hub sections, taken on an enlarged scale.

Referring to the drawing by characters of reference, the letter A designates generally my improved resilient wheel, which consists of a hub B, connected to an outer rim C by a plurality of spokes D. The rim C has secured to its outer periphery a tire E.

The hub B consists of a tubular member 1, which is reinforced at its middle point, as indicated by 2, and provided with a pair of spaced annular supporting flanges 3. The opposite ends of the tubular member, are reduced, as at 4, to provide bearing shoulders 5, against which contact the bearing disks 6, corresponding in size and shape to the flanges 3. An axle 7 extends through the tubular member 1 and is provided with a shoulder 8, which abuts against one of the disks 6 and serves with a locking nut 10, located on the threaded end of the axle to hold the disks 6 and the several parts of the hub in place. A pair of centrally apertured disks 11 and 12 are interposed between the flanges 3 and disks 6, and are held in spaced relation to the tubular member 1 by a series of spring connecting elements 13. The elements 13, comprise telescoping sections 14 and 15, the former of which is reduced, as at 16, to provide a sleeve 17, the opposite sides of which are connected by a pin 18, which passes through slots 19 formed in one end of the said section 15, which section extends longitudinally through the section 14, and is formed at one end with an enlargement 20, against which rests a washer 21, the outer periphery of which engages the inner side of the section 14 and holds the section 15 in spaced relation thereto. A pin 22 passes through the enlargement 20 and through slots 23 formed in the end of the member 14.

A washer 24 is slidably located upon the member 15, and engages the reduced end 16 of the member 14, while a spring surrounds the member 15 and engages the washers 21 and 24, thereby providing a resilient connection between the telescoping sections 14 and 15.

The opposite ends of the pin 22 extend through apertures located in the flanges 3, while the opposite ends of the pin 18 extend through apertured ears 25 formed upon the ends of supporting plates 26, which are bolted, or otherwise secured, to the laterally extending peripheral flange 27 formed upon one side of the disk 12 and secured to the disk 11 in any suitable manner.

The contacting faces of the disks 6, 11 and 12 are each provided with circular grooves 28, adapted to receive packing rings 29, which extend slightly beyond the surface thereof and prevent any undesired wearing arising from the movement of the disks 6, caused by the passage of the wheel over rough ground.

The outer periphery of the flange 27 has formed thereon a plurality of sockets, in which are secured the inner ends of the before-mentioned spokes D.

The tire E is formed of rubber or any other suitable material, which produces a slight resiliency to the tire.

From the foregoing disclosures, taken in connection with the accompanying drawings, it will be manifest that a wheel of the nature described is provided which will answer all of the necessary requirements of such a device.

Having thus particularly described this invention, what I claim as new and desire to protect by Letters Patent is:

1. A spring wheel comprising a hub, a spaced outer rim, pairs of telescoping members secured to said hub and said rim, each of said telescoping members comprising an outer sleeve having a reduced portion adjacent one end thereof and longitudinal slots diametrically oppositely disposed and formed adjacent the opposite end within the unreduced portion, a second sleeve mounted within said first sleeve and having a reduced terminal slidably engaging the reduced portion of said first mentioned sleeve, said reduced portion of said second sleeve provided with longitudinal slots oppositely disposed adjacent the end thereof, a spring mounted upon said reduced portion of said second sleeve within said unreduced portion of said first mentioned sleeve, washers arranged adjacent the terminals of the spring and mounted upon the reduced portion of said second sleeve, and means for securing the terminals of said telescoping members to said hub and said means for spacing the rim.

2. A spring wheel comprising a hub, a spaced outer rim, a plurality of telescoping members in pairs secured at their terminals to said rim and said hub respectively, each of said telescoping members comprising an outer sleeve having a reduced portion at one end thereof and provided with longitudinal slots adjacent the other unreduced terminal, a second sleeve having a reduced portion at one end thereof of greater length than the unreduced portion, said second sleeve slidably mounted within said first mentioned sleeve, washers mounted upon said unreduced portion and engaging the first mentioned sleeve, a spring mounted upon said reduced portion of said second sleeve and engaging said washers, the reduced portion of said second sleeve provided with longitudinal slots adjacent its free terminal, supporting plates secured to said rim spacing means, a pin extending through said reduced portion of the first mentioned sleeve and the longitudinal slots formed in the reduced portion of the second sleeve and one of the supporting plates, a second pin mounted upon said hub and extending through the longitudinal slots of the unreduced portion of the first mentioned sleeve and the unreduced portion of the second sleeve.

In testimony whereof I affix my signature in presence of two witnesses.

F. PETER HOLMES.

Witnesses:
F. D. LOUREY,
BOB L. VICTOR.

---

Copies of this patent may be obtained for five cents each, by addressing the "Commissioner of Patents, Washington, D. C."